(12) United States Patent
Samuelsson et al.

(10) Patent No.: US 12,153,442 B2
(45) Date of Patent: Nov. 26, 2024

(54) METHOD OF OPERATING A FLEET OF AUTONOMOUS VEHICLES

(71) Applicant: VOLVO CONSTRUCTION EQUIPMENT AB, Eskilstuna (SE)

(72) Inventors: Ted Samuelsson, Kolbäck (SE); Lars Thunberg, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 259 days.

(21) Appl. No.: 17/785,290

(22) PCT Filed: Dec. 18, 2019

(86) PCT No.: PCT/EP2019/085985
§ 371 (c)(1),
(2) Date: Jun. 14, 2022

(87) PCT Pub. No.: WO2021/121579
PCT Pub. Date: Jun. 24, 2021

(65) Prior Publication Data
US 2023/0028338 A1    Jan. 26, 2023

(51) Int. Cl.
*G05D 1/00* (2024.01)
(52) U.S. Cl.
CPC ......... *G05D 1/0293* (2013.01); *G05D 1/0217* (2013.01); *G05D 1/0223* (2013.01); *G05D 1/0225* (2013.01); *G05D 1/0278* (2013.01)
(58) Field of Classification Search
CPC .. G05D 1/0293; G05D 1/0217; G05D 1/0223; G05D 1/0225; G05D 1/0278
See application file for complete search history.

(56) References Cited

U.S. PATENT DOCUMENTS 5,772,390 A * 6/1998 Walker ................. G01G 13/024
222/64
2016/0082954 A1 3/2016 Rennemann et al.
(Continued)

FOREIGN PATENT DOCUMENTS

WO    WO 2019/049404 A1    3/2019

OTHER PUBLICATIONS

International Search Report and Written Opinion of the International Searching Authority, PCT/EP2019/085985, mailed Sep. 8, 2020, 12 pages.
(Continued)

*Primary Examiner* — Anshul Sood
*Assistant Examiner* — Oliver Tan
(74) *Attorney, Agent, or Firm* — Sage Patent Group

(57) ABSTRACT

The invention relates to method of operating a fleet of autonomous vehicles at a work site having a loading area at which a loading device is provided for loading material onto said autonomous vehicles. The method includes controlling a first vehicle to drive in a first driving mode until it reaches a start position of the loading area, deactivating the first driving mode by controlling the first vehicle to be positioned in the loading area in a second driving mode, controlling a second vehicle to come into contact with and to push the first vehicle along the loading area and past the loading device for loading material onto the first vehicle as the first vehicle passes by the loading device, and reactivating the first driving mode of the first vehicle when the second vehicle has pushed the first vehicle to an end position of the loading area.

21 Claims, 6 Drawing Sheets

(56) References Cited

U.S. PATENT DOCUMENTS

| | | |
|---|---|---|
| 2016/0134995 A1 | 5/2016 | McCoy et al. |
| 2016/0217535 A1* | 7/2016 | Kodama ................. E21C 41/00 |
| 2016/0230355 A1 | 8/2016 | Nelson |
| 2017/0009408 A1 | 1/2017 | Lee et al. |
| 2019/0137287 A1 | 5/2019 | Pazhayampallil et al. |
| 2019/0339709 A1 | 11/2019 | Tay et al. |
| 2019/0367030 A1 | 12/2019 | Tanaka et al. |

OTHER PUBLICATIONS

Communication under Rule 71(3) EPC: Intention to Grant for EP Patent Application No. 19829141.1, mailed May 24, 2023, 46 pages.

Brazilian Office Action, Brazilian Application No. BR112022011724-8, mailed Jun. 25, 2024, 4 pages.

* cited by examiner

METHOD OF OPERATING A FLEET OF AUTONOMOUS VEHICLES

CROSS REFERENCE TO RELATED APPLICATIONS

This application is a 35 U.S.C. § 371 national stage application of PCT International Application No. PCT/EP2019/085985 filed on Dec. 18, 2019, the disclosure and content of which is incorporated by reference herein in its entirety.

TECHNICAL FIELD

The invention relates to a method of operating a fleet of autonomous vehicles. The invention also relates to a computer program and to a computer readable medium for implementing the method. The invention further relates to a control unit for implementing the method. The invention additionally relates to a system comprising such a control unit.

The invention can be applied in autonomous vehicles such construction equipment, in particular autonomous working machines in the form of load carriers. Although the invention will be described with respect to working machines, the invention is not restricted to this particular vehicle, but may also be used in other vehicles such as trucks or other vehicles with load carrying capability.

BACKGROUND

Working machines in the form of articulated haulers, wheel loaders, trucks, forwarders and dumpers are frequently used for loading and/or transporting of material loads at construction sites, in forestry and the like. A load-receiving container of a hauler or dump truck may for instance be loaded with unprocessed material, such as rock fragments, at a loading location, transport the material to another location and dump the material (in)to a material processing device, such as into a buffering feeder of a crusher arranged to crush the rock fragments into smaller fragments. Alternatively, a wheel loader, excavator or other working machine may directly dump the material in(to) such a material processing device. The smaller fragments may in turn be loaded onto other load carrying working machines for further transportation.

Recent development has shown that the use of autonomous vehicles may advantageously be used for transportation of materials, such as crushed rock fragments. The loading of material onto such autonomous vehicles may, however, present a challenge, in particular when it comes to reducing spillage of material that inadvertently falls to the ground next to the working machine instead of onto a material-receiving part of the working machines. For instance, the timing relating to when an autonomous vehicle should enter and/or leave a loading area may be improved to reduce the risk of spillage.

SUMMARY

An object of the invention is to provide a method of operating a fleet of autonomous vehicles at a work site having a loading area, which method reduces the risk of spillage.

The object is achieved by a method according to claim 1. Thus, according to a first aspect of the present invention, there is provided a method of operating a fleet of autonomous vehicles at a work site having a loading area at which a loading device is provided for loading material onto said autonomous vehicles, the method comprising:

controlling a first vehicle of said autonomous vehicles to drive in a first driving mode until it reaches a start position of the loading area, deactivating the first driving mode for the first vehicle by controlling the first vehicle to be positioned in the loading area in a second driving mode, controlling a second vehicle of said autonomous vehicles to come into contact with the first vehicle and to push the first vehicle along the loading area and past the loading device for enabling loading of material onto the first vehicle from the loading device as the first vehicle passes by the loading device, reactivating the first driving mode of the first vehicle when the second vehicle has pushed the first vehicle to an end position of the loading area.

By the provision of a method in which a second vehicle pushes the first vehicle along the loading area and past the loading device, a continuous discharging from the loading device may be carried out with reduced risk of material falling between the two vehicles. In other words, since the first and the second vehicles are in contact with each other during the passing of the first vehicle across the loading area, there can be a substantially seamless switch from the first vehicle becoming loaded with material and passed by the loading device, to the second vehicle becoming loaded with material. An advantage over the prior art in which material could more often be dropped to the ground and then needed to be lifted up and dumped onto the load carrying vehicle, is that the risk of material dropping is greatly reduced or eliminated, and thus the time for lifting up such dropped material is reduced or eliminated, and thus the productivity and efficiency is increased.

From the above it should be understood that the invention is generally based on the realization that the distance between a vehicle which is loaded (or is becoming loaded) and the vehicle next in queue may be controlled in order to reduce the risk of spillage. In particular the risk of spillage is reduced by controlling the distance to be zero at the loading area, i.e. by controlling the next in queue vehicle to push the vehicle that is becoming loaded past the material-feeding loading device.

According to at least one exemplary embodiment, the first and second vehicles are designed such that when the second vehicle has come into contact with and pushes the first vehicle, the front end portion of the second vehicle overlaps the rear end portion of the first vehicle. This is advantageous, since this may allow a front portion of the material-receiving part of the second vehicle to overlap a rear portion of the material-receiving part of the first vehicle, whereby material may smoothly continue to fall into the second vehicle when the first vehicle has arrived at the end position of the loading area.

From the above, it can be understood that, at least in some exemplary embodiments, the end position of the loading area may be a position in which the first vehicle would, at a rear portion of the material-receiving part, receive material falling from the loading device unless a front portion of the second vehicle overlaps said rear portion of the first vehicle. Similarly, it can be understood that, at least in some exemplary embodiments, the start position of the loading area may be a position at which a front portion of the material receiving-part of the vehicle receives material falling from the loading device.

Suitably, the method may be repeated with several vehicles, depending on the number of autonomous vehicles and the size of the work site. Suitably, the number of autonomous vehicles may be such that a substantially continuous flow of vehicles past the loading device may be achieved in accordance with the method. Thus, when the second vehicle has arrived at the start position of the loading area (which may suitably be substantially simultaneously with the first vehicle arriving to said end position of the loading area), then the second vehicle may be deactivated from its first driving mode (which it has used when pushing the first vehicle) and a third vehicle may come into contact with and push the second vehicle through the loading area. Thus, in general terms the $n^{th}$ autonomous vehicle may be contacted and pushed by the $(n+1)^{th}$ autonomous vehicle.

According to at least one exemplary embodiment, in said second driving mode a motor (such as an electric motor) of the first vehicle generates a fixed negative torque or a zero torque. By having the first vehicle generating a negative torque or a zero torque the first second vehicle will easily come into contact with the first vehicle. The control of the first vehicle in the second driving mode may include generating a zero torque at one point in time and a negative torque at another point in time. For instance, when the first vehicle has arrived at the loading area, the first driving mode is deactivated, and the second driving mode is activated by setting a zero torque generation for the motor of the first vehicle. When the second vehicle has come into contact with the first vehicle, the motor of the first vehicle may be set to generate a fixed negative torque, thus ensuring that the first vehicle will not roll away from the pushing second vehicle, but will maintain the contact. Negative torque generation of the motor of the first vehicle may be set even before the second vehicle has come into contact with the first vehicle, whereby the first vehicle may be slowly reversing to meet the approaching second vehicle, and then after contact has been made the negative torque is maintained until the first vehicle arrives at the end position of the loading area.

According to at least one exemplary embodiment, in said second driving mode, the first vehicle is temporarily still or reversing, such as slowly reversing. By having the first vehicle temporarily still or reversing, the second vehicle will easily come into contact with the first vehicle.

It should be understood that for each vehicle in the fleet of autonomous vehicles, a second driving mode may include any suitable operating behaviour that allows the following vehicle (which is in the first driving mode) to come into contact with and push the vehicle in front of it (which is in the second driving mode) so that both vehicles can be loaded with material while avoiding material to fall between the two vehicles. For instance, the second driving mode may be that the first vehicle is idle. As mentioned above, the second driving mode of the first vehicle may be that the motor of the first vehicle generates a fixed negative torque and/or that the first vehicle is reversing, suitably slowly. In fact, in some exemplary embodiments the second driving mode may even include that the first vehicle may continue to drive forwardly, very slowly, as long as the second vehicle has time to come into contact with, and maintain contact with, the first vehicle to avoid material from the loading device falling between the two vehicles.

From above it can be understood that, suitably, less propulsion power is provided from a propulsion device of a vehicle to the wheels of the vehicle in its second driving mode than in its first driving mode. This may be the case irrespective of the type of propulsion device, such as an electric motor, internal combustion engine, etc. The propulsion power may even be zero. Indeed, the motion of the first vehicle when passing along the loading area for receiving material from the loading device, may be caused purely by propulsion power from the pushing second vehicle.

As already hinted above, according to at least one exemplary embodiment, the second vehicle arrives at the start position of the loading area simultaneously with the first vehicle arriving at the end position of the loading area, wherein the method comprises controlling the second vehicle to drive in said first driving mode until it has reached the start position of the loading area. This is advantageous in that when the first vehicle is ready to leave the loading area (i.e. being at the end position), the second vehicle is already ready at the start position of the loading area for receiving material. Thus, the material flow from the loading device does not need to be interrupted.

The above mentioned first driving mode, may include driving at the work site outside of the loading area, and may also include pushing another vehicle at the loading area. Thus, when the second vehicle pushes the first vehicle, the second vehicle is in the first driving mode. The first vehicle may have arrived at the start position by pushing a previous vehicle through the loading area or by driving there without pushing any vehicle. Either case is considered to be included in what is referred to as a first driving mode.

According to at least one exemplary embodiment, the length of the first vehicle is substantially equal to the length of the second vehicle. Furthermore, the length of a material-receiving part (such as a container) of the first vehicle is suitably equal to the length of the material-receiving part of the second vehicle. According to at least one exemplary embodiment, the distance between the start position and the end position of the loading area, substantially corresponds to the length of each vehicle and/or the length of each material-receiving part of the vehicles. This is beneficial since it will facilitate the second vehicle to arrive at the start position at the same time as the first vehicle arrives at the end position. Suitably, all vehicles in the fleet have the same length and/or each material-receiving part (such as container) of the respective vehicles of the fleet have the same length. However, it should be noted that in other exemplary embodiments, the vehicles in said fleet of autonomous vehicles may have mixed lengths. Thus, the length of one or more vehicles may differ from the length of any other vehicle/vehicles in the fleet. This may, for instance, be conceivable by implementing dynamic start points and/or end points.

In at least some exemplary embodiments, the distance between the start position and the end position may be (somewhat/slightly) smaller than the length of the material-receiving part (e.g. container) of the vehicle. For instance, the start position may be selected such that it is at a position where a (minor) part of the material-receiving part has already passed the loading device. This allows the (first) vehicle that has arrived at the start position to slowly reverse to come into contact with a pushing (second) vehicle without risking spillage.

Suitably, the vehicles may be provided with bumpers or other resilient or force-absorbing or force-distributing structure for providing a relatively smooth contacting between the vehicles when a vehicle is controlled to push another vehicle. Furthermore, as mentioned above, the vehicle that has arrived to the start position of the loading area may slowly reverse in a second driving mode until it comes into contact with a second vehicle which follows behind the first vehicle.

According to at least one exemplary embodiment, said step of controlling the second vehicle to push the first vehicle, comprises determining a vehicle parameter and/or a load parameter,
determining a pushing speed based on the determined vehicle parameter and/or load parameter, and
controlling the second vehicle to push the first vehicle with the determined pushing speed.

The vehicle parameter should be understood to be related to a property of the vehicle as such. The load parameter should be understood to be related to a property of the material to be loaded or of the loading device. By basing the pushing speed on a determined vehicle parameter and/or load parameter, a good utilisation of the vehicle fleet may be achieved. For instance, the size of the material fragments that are loaded and the speed of loading may affect how quickly the first vehicle will become fully loaded, or at least enough loaded, and therefore affect how quickly it should be pushed under a continuous feeding of material from the loading device. Another parameter, a vehicle parameter may be the available loading volume, which also affects how quickly the first vehicle will become enough loaded. Of course, other vehicle parameters may also be used for determining the pushing speed.

According to at least one exemplary embodiment, the vehicle parameter is selected from the group consisting of (the selection may include one or more of):

a state of charge of a traction battery of the first vehicle,
a fuel level of the first vehicle,
available loading volume of the first vehicle,
allowable loading weight of the first vehicle,
geometrical shape of the material-receiving part of the first vehicle.
tire pressure in the tires of the first vehicle,
efficiency of an electric motor of the first vehicle.

If the state of charge of a traction battery of the first vehicle is low, it may be advisable to avoid the first vehicle to become fully loaded, to reduce the risk of the traction battery becoming completely discharged before reaching a recharging facility. Thus, another vehicle parameter which may form basis for determining the pushing speed may be distance to or time to recharging the traction battery of the first vehicle. Similar considerations apply to fuel (e.g. diesel) based vehicles, in which case a low fuel level may trigger a relatively high pushing speed so that the first vehicle does not become too heavily loaded.

In some exemplary embodiments, if the state of charge of the traction battery is below a predetermined value, the pushing speed is chosen such that the material loaded onto the first vehicle is below a predetermined threshold weight and/or threshold volume.

Measuring the geometrical shape of the material-receiving part of the first vehicle may be advantageous in various respects. For instance, the material receiving part may be in the form of a bucket. The pushing speed may be varied during filling of the bucket based on the shape thereof, in order to achieve a desired filling factor and centre of gravity. Basing the pushing speed on the tire pressure or efficiency of an electric motor may also be advantageous. For instance, if the first vehicle has a low tire pressure, defective electric motor, or other limiting properties, it may be desirable to decrease the maximum allowable load, and thus increase the pushing speed.

It should be understood that the determination of the pushing speed may be based on two or more parameters, for instance based on at least two vehicle parameters, or based on at least two load parameters, or based on at least one vehicle parameter and at least one load parameter.

As can be understood from above, according to at least some exemplary embodiments, the autonomous vehicles of said fleet of vehicles may suitably be electric vehicles, each one powered by one or more traction batteries.

According to at least one exemplary embodiment, the first vehicle comprises a first local control unit, wherein the method comprises:

transmitting a signal representative of the determined vehicle parameter and/or load parameter from the first local control unit to a second local control unit provided on the second vehicle or to a central control unit provided separately from the vehicles, and/or
transmitting a signal representative of the determined pushing speed to a second local control unit provided on the second vehicle or to a central control unit provided separately from the vehicles.

This is advantageous since the signals may be sent from the first vehicle providing real time information of the relevant parameter(s). For instance, the first local control unit may transmit one or more signals comprising data relating to the state of charge of a traction battery of the first vehicle, the available loading volume and/or the available loading weight. The first vehicle may suitably be provided with appropriate sensors, such as weight and/or level sensors, which may be operatively connected to the first local control unit for continuously or periodically provide data to the first local control unit, for transmitting said signals. However, the first local control unit does not necessarily have to transmit such parameter-representing signals, but may in some exemplary embodiments perform a calculating operation based on received sensor data, and then transmit said signal representative of the determined pushing speed.

From the above, it should be understood that the determination of the pushing speed may be accomplished by means of calculating operations performed by any suitably calculating unit, such either one of said first local, said second local or said central control unit. For instance, in some exemplary embodiments, the first local control unit may calculate and send the signal representative of the determined pushing speed to the second local control unit or to the central control unit. In other exemplary embodiments, the second local control unit itself may do the calculations. In further exemplary embodiments, the central control unit may do the calculations, and may then transmit the signal representative of the determined pushing speed to the second local control unit, which will then control the vehicle to drive with said determined pushing speed.

Each one of said control units, i.e. each one of said first local control unit, said second local control units and said central control unit may include a microprocessor, microcontroller, programmable digital signal processor or another programmable device. Each one of the control units may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to at least one exemplary embodiment, the load parameter is selected from the group consisting of (the selection may include one or more of):

size of the material to be loaded onto the first vehicle,
weight of the material to be loaded onto the first vehicle, speed of loading the material onto the first vehicle,
the type of material.

The load parameter may be provided as a manual input or as an automatic input. For instance, a person, such as an operator or fleet manager, may via a user interface enter a feeding speed of the loading device. The entered information may then be conveyed to a control unit, such as the above discussed central control unit. In case of automatic input, there may be provided sensors, such as optical sensors, weight sensor, speed sensors, which may suitably be provided at the loading device, and may be operatively communicating with one or more control units, such as said central control unit, either directly or indirectly via another unit. As regards the type of material, it should be understood that different types of material have different fill factors. For instance, rock fragments has a different fill factor than sand, and might therefore need a different marginal.

According to at least one exemplary embodiment, the determined pushing speed is further determined based on one or more of the following parameters:
- a fleet distribution parameter in the form of geographical distribution of the vehicles of said fleet of autonomous vehicles at the work site,
- an energy cost parameter in the form of load per consumed energy for the first vehicle to transport the load to an unloading area,
- a productivity parameter in the form of delivered load per time unit for the first vehicle to deliver the load to an unloading area,
- an environmental parameter in the form of present weather and/or road conditions at the work site.

Basing the pushing speed on the fleet distribution parameter may be advantageous for providing a smooth flow of vehicles. For instance, if there are several vehicle in the vicinity of the loading area, but barely any between the loading area and a dump spot or unloading area, then it may be desirable to control the vehicle to receive less load (i.e. higher pushing speed) in order to avoid queuing later on. Similarly, if there is a gap after between the second vehicle and any following vehicles near the loading area, then it may be desirable to gain time and you would therefore load the first vehicle to a full or nearly full level (i.e. low pushing speed), thereby allowing the following vehicles to catch-up, whereby interruption of the chain of vehicles can be avoided at the loading area (assuming the fleet has a plurality of vehicles, not just two).

The energy cost parameter may advantageously be used as an input for controlling the pushing speed if it is desirable to reduce energy cost per ton (tonnes/Ah) for transporting the loaded material from the loading area to the unloading area. This may be tailored for a particular cycle/process and may suitably involve machine learning for obtaining a desired energy cost level.

In some cases, a site manager may wish to achieve as high productivity as possible (tonnes/hour) independent of the cost to finalize an order in time. In such cases, the pushing speed and thus the load may be set differently depending on production planning parameters.

Weather and/or road conditions at the work site may affect the maximum possible load that a vehicle can transport in a safe enough manner, and may therefore advantageously be used as input parameter to determine the pushing speed.

As already mentioned above, the method presented in connection with the first and second vehicles, may suitably be repeated with a third, and/or subsequent vehicles. Thus, according to at least one exemplary embodiment, said fleet of autonomous vehicles further comprises a third vehicle, wherein the method comprises, when the second vehicle has reached the start position of the loading area:
- deactivating the first driving mode for the second vehicle by controlling the second vehicle to be positioned in the loading area in the second driving mode,
- controlling the third vehicle to come into contact with the second vehicle and to push the second vehicle along the loading area and past the loading device for enabling loading of material onto the second vehicle from the loading device as the second vehicle passes by the loading device,
- reactivating the first driving mode of the second vehicle when the third vehicle has pushed the second vehicle to an end position of the loading area.

By having three or more vehicles passing by a continuous feed of material from the loading device, the risk of spillage is reduced over a prolonged period of time.

According to at least one exemplary embodiment, the start position and the end position are defined by geographical coordinates, wherein the method comprises determining the geographical location of the autonomous vehicles by using a global navigation satellite system. A global navigation satellite system (GNSS) may be any satellite constellation that provides positioning, navigation, and timing (PNT) services on a global or regional basis. Examples of such systems include GPS, BeiDou, Galileo, GLONASS, IRNSS, and QZSS. This is advantageous since it provides an efficient determination of the position of each vehicle.

According to at least one exemplary embodiment the position tracking is provided by vehicle presence detectors configured to generate data indicative of the presence of the vehicle, wherein a processing unit is configured to receive the generated data from the presence detector and configured to determine the position of the vehicle based on the received data. In at least some exemplary embodiments, the vehicle presence detector is an image capturing unit, such as a camera. In at least some exemplary embodiments, the vehicle presence detector comprises a wave emitter and a wave received for receiving a reflected wave, wherein the vehicle presence detector is suitably one of a Lidar, radar or ultrasonic detector. The use of vehicle presence detectors may be advantageous in environments where global navigation satellite system signals are weak or non-existent.

This may be the case in underground mining, or near large buildings, etc. Of course, vehicle presence detectors may be used also where satellite system signals are satisfactory. It should be understood that the geographical coordinates may either be global geographical coordinates, for instance based on a GNSS, or they may be local to the work site where the vehicles are operated. The latter being particularly suitable for underground mining, for instance.

According to at least one exemplary embodiment, the loading device comprises a position tracking device, wherein the method comprises:
- sending, from the position tracking device to a central control unit, a signal representative of the geographical position of the loading device.

By knowing the geographical position of the loading device, the central control unit can define the geographical positions of the start position and the end position of the loading area. Suitably, the rotational orientation of the loading device may also be provided to the central control unit.

Thus, according to at least one exemplary embodiment, the method comprises:

defining the start position of the loading area and the end position of the loading area based on the geographical position of the loading device.

As mentioned above, the start and end positions of the loading area may be defined by a central control unit. Alternatively, it is conceivable, that these positions are calculated by a different calculating unit, or even by a person who enters the defined positions via a user interface of a fleet management system.

Similarly, according to at least one exemplary embodiment of the method, each vehicle may be provided with a respective local position tracking device configured to send to the central control unit a signal representative of the geographical position of the respective vehicle.

According to at least one exemplary embodiment, the loading device comprises a conveyor belt from which material is droppable onto the autonomous vehicles. This is advantageous, since it allows a continuous feed of material from the conveyor belt. A working machine, such as a wheel loader, excavator or the like, may supply the material to the conveyor belt, either directly or via some other device (for instance, via a crusher). It should, however, be understood that in other exemplary embodiments the loading device may be a different type of feeder, or may even be an actual working machine, such as a wheel loader or excavator. Thus, in some exemplary embodiments, the loading device (such as a conveyor belt) may be configured to feed material continuously to the loading area, while in other exemplary embodiments, the loading device (such as a wheel loader) may be configured to periodically provide material to the loading area.

According to at least one exemplary embodiment, the method comprises controlling said fleet of autonomous vehicles so that there is a continuous flow of vehicles past the loading device. This is particularly advantageous for cases in which material is continuously fed from the loading device, for instance material being continuously fed from a conveyor belt and the vehicles are configured to pass under a dispensing end of the loading device to receive the materials that fall from the dispensing end of the loading device. Thus, according to at least one exemplary embodiment, the loading device has a dispensing end, and the second vehicle is controlled to push the first vehicle under the dispensing end so that material falling from the dispensing end of the loading device is received by the first vehicle.

According to a second aspect of the invention, the object is achieved by a computer program comprising program code means for performing the steps of the method of the first aspect, including any embodiment thereof, when said program is run on a computer.

According to a third aspect of the invention, the object is achieved by a computer readable medium carrying a computer program comprising program code means for performing the steps of the method of the first aspect, including any embodiment thereof, when said program product is run on a computer.

According to a fourth aspect of the invention, the object is achieved by a control unit for controlling the operation of a fleet of autonomous vehicles, the control unit being configured to perform the steps of the method of the first aspect, including any embodiment thereof.

The advantages of the second, third and fourth aspects of the invention are largely analogous to the advantages of the first aspect of the invention.

According to a fifth aspect of the invention, the object is achieved by a system for operating a fleet of autonomous vehicles, the system comprising a control unit according to the fourth aspect, including any embodiment thereof.

The advantages of the fifth aspect of the invention are largely analogous to the advantages of the first, second, third and fourth aspects of the invention.

Furthermore, the fifth aspect of the invention has numerous exemplary embodiments, some of which are presented below.

According to at least one exemplary embodiment the control unit is a central control unit provided separately from the vehicles. The central control unit may suitably form part of a fleet management system. The central control unit may be configured to receive information, data, signals relating to different vehicle parameters, load parameters and other parameters that may be advantageous for calculating and determining a suitable operational control for each vehicle of said set of autonomous vehicles.

According to at least one exemplary embodiment, the system further comprises local control units, each vehicle being equipped with a respective one of said local control units. As explained previously in connection with the first aspect of the invention, some information may suitably be provided directly from the local control units, and in some exemplary embodiments some calculations may even be performed by the local control units.

According to at least one exemplary embodiment, said local control units are configured to send signals representative of said vehicle parameter and/or said load parameter (which were discussed in connection with the first aspect of the invention) to the central control unit, wherein the central control unit is configured to control the operation of the vehicles based on the received signals.

According to at least one exemplary embodiment, the system further comprises a position tracking device configured to send to the central control unit a signal representative of the geographical position of the loading device. As mentioned above, the central control unit may then define the start position and the end position of the loading area.

According to at least one exemplary embodiments, each vehicle is provided with a local position tracking device configured to send to the central control unit a signal representative of the geographical position of the respective vehicle. The central control unit will thus be able to accurately control the vehicles and the send instructions on which driving mode, such as driving forward, rearward, turning, speed of the vehicle, etc.

According to at least some exemplary embodiments, the vehicles of said fleet of autonomous vehicles drive along a predefined path through the work sit. The predefined path may suitably form a closed curve such that when the material have been unloaded from a vehicle it may again be controlled to drive to the loading area to receive a new load of materials. Hereby, a steady flow of vehicles along the loading area may be achieved. When a vehicle has received a load, it may suitably be controlled to a target area, for example, for unloading the material.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
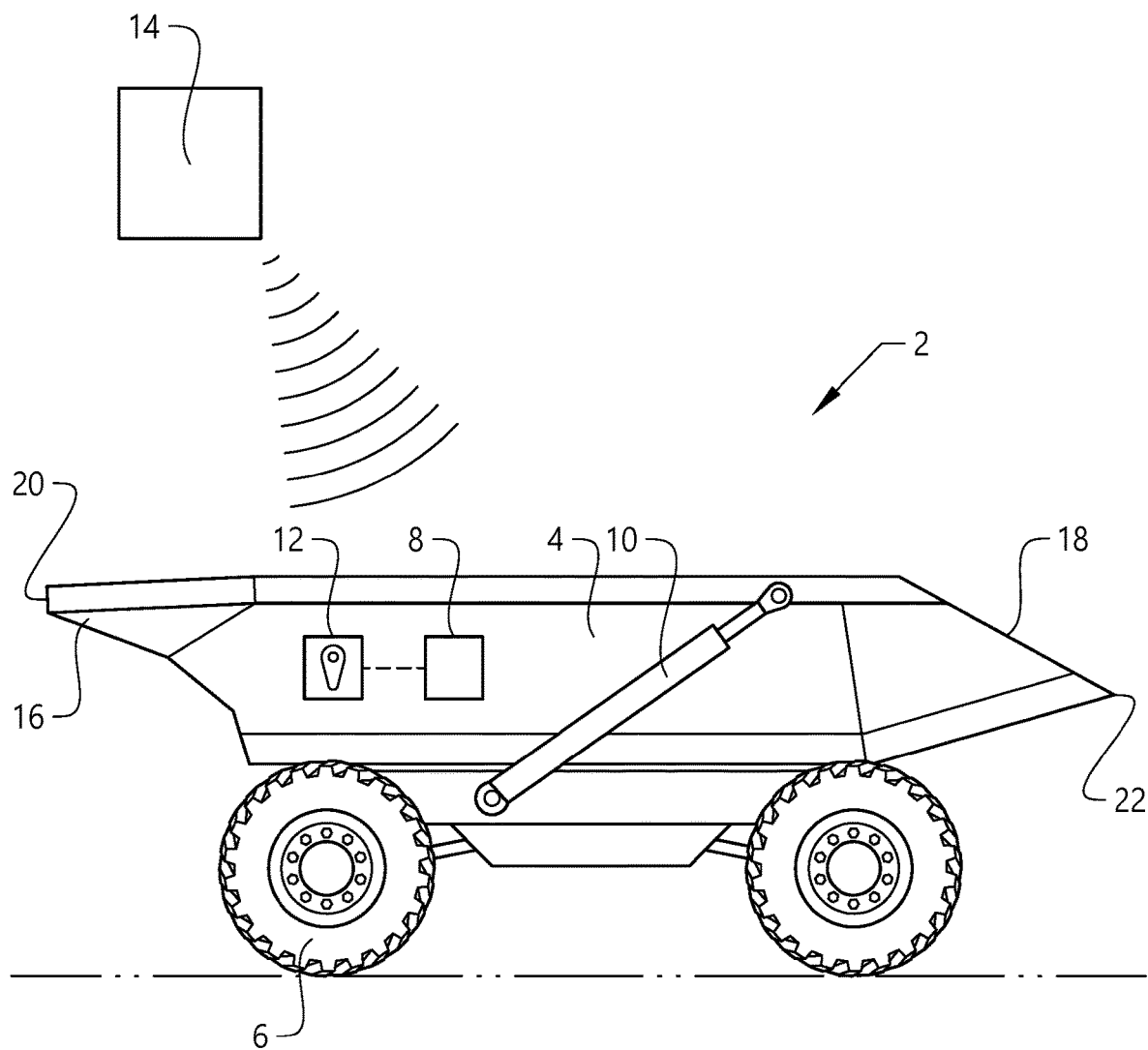
FIG. 1 is a schematic illustration of at least one exemplary embodiment of a vehicle which may be comprised in a fleet of autonomous vehicles. Such a fleet may be operated in accordance with a method in accordance with at least one exemplary embodiment of the invention.

FIG. 1 is a schematic illustration of at least one exemplary embodiment of a vehicle 2 which may be comprised in a fleet of autonomous vehicles. Such a fleet may be operated in accordance with a method according to at least one exemplary embodiment of the invention.

The vehicle 2 is an autonomous vehicle and may suitably be electrically powered. For instance, it may be powered by one or more traction batteries energizing an electric motor. In other exemplary embodiments it may be a fuel (e.g. diesel) based vehicle, a hybrid vehicle, hydrogen gas driven vehicle etc. The illustrated vehicle 2 may be in the form of a wagon, having an open top at a material-receiving part 4. The material-receiving part 4 may be in the form of a container presenting a volume into which material may be dispensed.

The vehicle 2 may be in the form of a working machine for use in one or more industrial applications, such as in quarries, mines, forestry, etc. The vehicle 2 may be driven at least in a forward direction, and suitably, also in a rearward direction. In the illustrated example, the vehicle 2 is provided with two pairs of wheels 6, however in other embodiments there may be more pairs of wheels, such as three pairs or four pairs etc. At least one of the pairs of wheels 6 may be controlled to turn the vehicle 2.

The vehicle 2 may be provided with a local control unit. The local control unit 8 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the local control unit 8.

The local control unit 8 may thus control the vehicle 2 for activating different driving modes, for instance, driving forwards, rearwards, temporarily still. The local control unit 8 may also set the speed of the vehicle 2 and the angle of the wheels 6 for the turning the vehicle 2. In exemplary embodiments, the local control unit 8 may also be configured to tip the material-receiving part 4 of the vehicle 2 for allowing material contained therein to be removed. For example, the vehicle 2 may be provided with a hydraulically actuated tipping mechanism such as including an extendable and retractable cylinder 10 as illustrated in the drawing. The local control unit 8 may thus be configured to control such a tipping mechanism.

As illustrated in FIG. 1, the vehicle 2 may also be provided with a local position tracking device 12 configured to send to a central control unit 14 a signal representative of the geographical position of the vehicle 2. The local position tracking device 12 may be a separate component communicating with the central control unit 14, or may be operatively connected to (or even an integrated part of) the local control unit 8 via which the position of the vehicle 2 may be communicated to the central control unit 14. It should be understood that in a fleet of autonomous vehicles, each vehicle may be provided with the components discussed in connection with FIG. 1. Thus, each vehicle may comprise a local control unit and a local position tracking device.

The communication between the local component(s) on the vehicle 2 (i.e. position tracking device 12 and/or the local control unit 8) and the central control unit 14 may be in the form of wireless communication (for instance, any form of radio communication).

The central control unit 14 will thus be able to accurately control the vehicles and the send commands on which driving mode to use, such as driving forward, rearward, turning, speed of the vehicle, etc. It should be noted that some decisions on the operation of the vehicle 2 may be taken by the local control unit 8, while other operating decisions may be taken by the central control unit 14 (which suitably has an overview of the entire fleet of vehicles), in which case the central control unit 14 will send operating commands to the local control unit 8. For instance, the local control unit 8 will typically decide on emergency braking in case a pedestrian or some other sudden obstacle appears in front of the driving vehicle 2, whereas typically it will be the central control unit 14 that will decide to which unloading location the vehicle 2 should transport a received load of material.

FIG. 1 further illustrates the vehicle 2 having a front end portion 16 and a rear end portion 18. The underside of the front end portion 16 extends diagonally upwardly towards the front end 20 of the vehicle 2. Conversely, the top of the rear end portion 18 extends diagonally downwardly towards the rear end 22 of the vehicle 2.

FIGS. 2a-2f illustrate an exemplary sequence which may take place when carrying out a method in accordance with at least one exemplary embodiment of the invention. In this sequence only two vehicles 2a, 2b have been illustrated for simplicity. The vehicles 2a, 2b may suitably be of the type discussed and illustrated in connection with FIG. 1, although other vehicle embodiments are also conceivable. It should be noted, that even though only two vehicles 2a, 2b are illustrated in FIGS. 2a-2f, which indeed reflects an embodiment encompassed by the inventive concept, in other exemplary embodiments of the method, there may advantageously be more vehicles in the fleet, as will be later discussed in connection with FIG. 3.

Figure 2A:
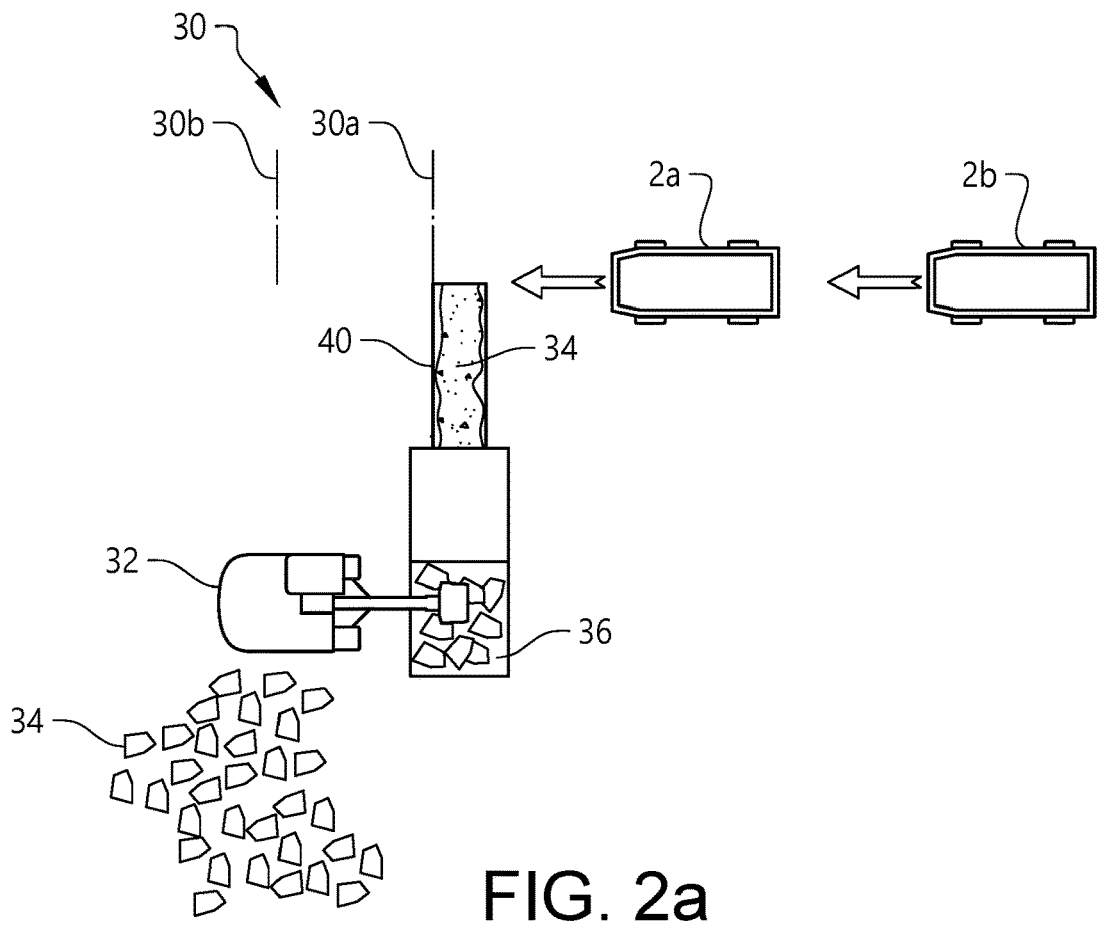
FIGS. 2a-2f illustrate an exemplary sequence which may take place when carrying out a method in accordance with at least one exemplary embodiment of the invention.

Starting with FIG. 2a, it illustrates two autonomous vehicles 2a, 2b, namely a first vehicle 2a and a second vehicle 2b, which are included in a fleet of autonomous vehicles. Suitably, all vehicles in said fleet may be of the same type. The vehicles 2a, 2b are provided for operating at a work site having a loading area 30. This may, for instance, be at a quarry, in a mine, in a forest, or any other environment/implementation in which material should be loaded onto vehicles for transportation to a different place. The loading area 30 may suitably be defined by geographical coordinates. In FIG. 2a, the work site is schematically illustrated as representing a quarry. A working machine 32, such as wheel loader or excavator may pick up large blocks of material 34 (such as rocks) in order to release them so that they fall into a crusher 36, in which the blocks are crushed into smaller pieces of material. The crushed material is then transported via a loading device 40, such as a conveyor belt, for dropping off the material at the loading area 30. It should be understood that the illustrated items are just one of many examples. For instance, in some cases, the crusher 36 may be omitted, a different type of loading device may be used, etc. The general inventive concept is thus neither limited to a particular loading device nor to how material 34 is provided to the loading device, but is rather based on how the autonomous vehicles 2a, 2b in the fleet are operated at the loading area 30.

As illustrated in FIG. 2a, the first vehicle 2a and the second vehicle 2b are both driving in a first driving mode towards the loading area 30. When the first vehicle 2a reaches a start position 30a of the loading area 30 (which may typically be defined by geographical coordinates identifiable by any suitably global navigation satellite system, GNSS), the first driving mode of the first vehicle 2a is deactivated. The deactivation may be such that the first vehicle 2a comes to a standstill, or the deactivation may be a reversing (typically a slow reversing). Such a standstill or reversing is thus a second driving mode of the first vehicle 2a. The controlling of the first vehicle 2a in the first driving mode and the deactivation thereof, may be performed by means of a local control unit or by a central control unit sending commands to the local control unit (such as the control units 8, 14 illustrated in FIG. 1). As indicated in FIG. 2a, the loading area 30 also has an end position 30b (which may similarly be defined by geographical coordinates identifiable by any suitably global navigation satellite system, GNSS).

The reference numerals 30, 30a and 30b have only been indicated in FIG. 2a, and have been omitted from FIGS. 2b-2f for the sake of clarity so that the figures are kept clean and easily comprehensible. However, it should be understood that when the loading area 30, the start position 30a and the end position 30b are discussed in connection with FIGS. 2b-2f, the same locations for these reference numerals are intended as for those illustrated in FIG. 2a.

It should also be understood that since each vehicle has a certain length. The start position 30a and the end position 30b may suitably be defined with respect to a specific point or portion of the vehicle. For simplicity, in this example, the start position 30a and the end position 30b have been defined with reference to the front end 20 of each vehicle. However, it will be readily understood that the start position 30a and the end position 30b may defined in other ways so that any other point or area of the vehicle may serve as a reference for determining when the vehicle has arrived at the start position 30a and the end position 30b.

Thus, according to at least one exemplary embodiment of the invention, the a reference point or reference area is defined for each vehicle, wherein when said reference point or reference area has reached the start position it is determined that the vehicle has reached the start position, and when said reference point or reference area has reached the end position it is determined that the vehicle has reached the end position. Thus, the different steps of the exemplary embodiments of the method may relate to the reference point or reference area. For instance, in exemplary embodiments, the method according to the first aspect may comprise the following steps:

controlling a first vehicle of said autonomous vehicles to drive in a first driving mode until the reference point or reference area of the first vehicle reaches the start position of the loading area, reactivating the first driving mode of the first vehicle when the second vehicle has pushed the first vehicle so that the reference point or reference area of the first vehicle has reached the end position of the loading area.

Figure 2B:
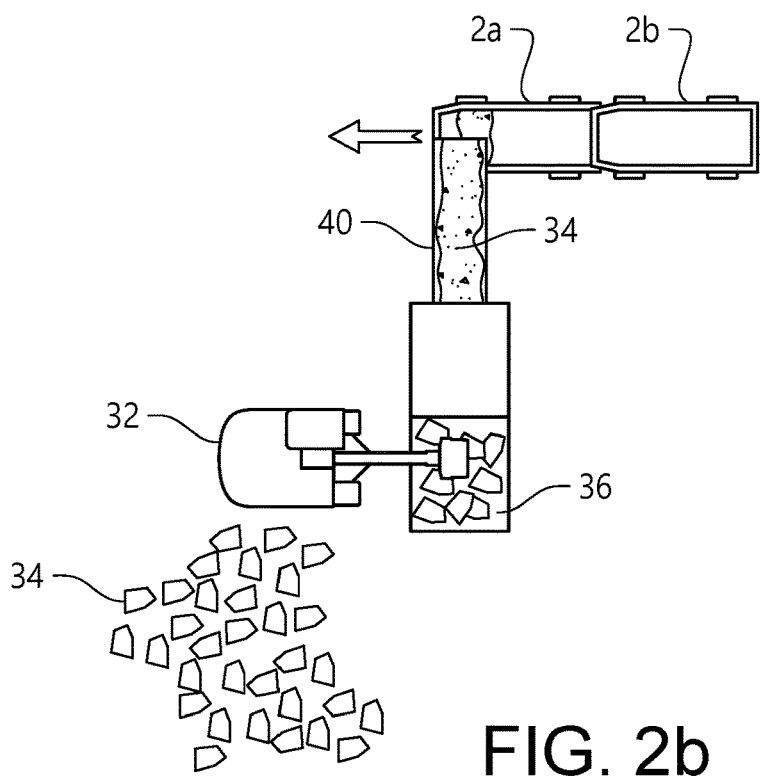

FIG. 2b illustrates that the first vehicle 2a has arrived at the start position 30a, and the first driving mode has been inactivated. The first vehicle 2a waits for the second vehicle 2b to come into contact with the first vehicle 2a. Such a contact may, in some embodiments, also be achieved by controlling the first vehicle 2a to slowly reverse to meet the approaching second vehicle. In FIG. 2b the second vehicle 2b has now come into contact with the first vehicle 2a.

Figure 2C:
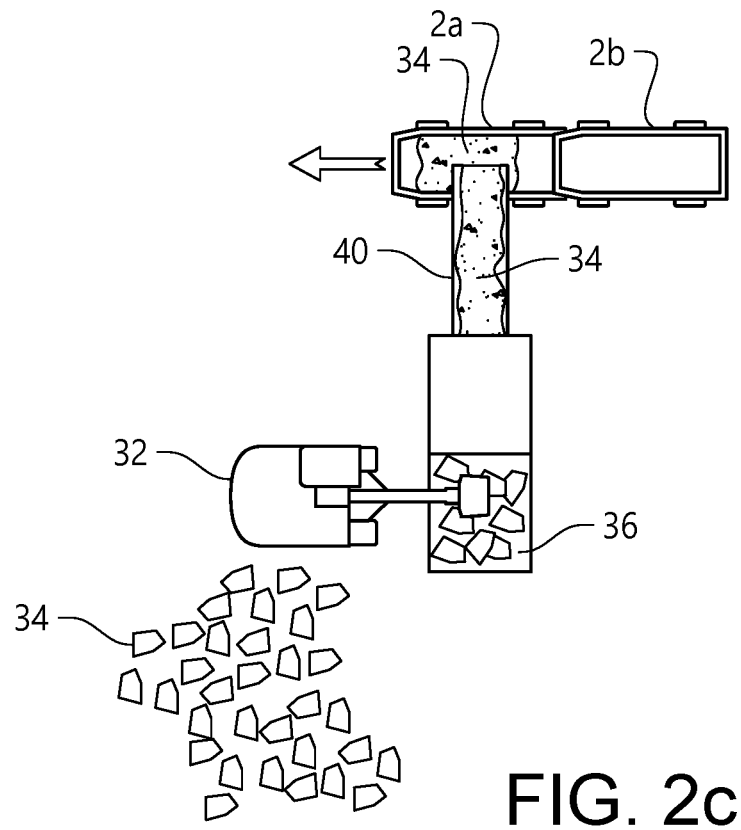

When the second vehicle 2b has come into contact with the first vehicle 2a it is controlled in such way that it pushes the first vehicle 2a along the loading area 30 and past the loading device 40. This is illustrated in FIG. 2c, which shows loading of material 34 onto the first vehicle 2a from the loading device 40 as the first vehicle 2a passes by the loading device 40.

As previously discussed, and with reference to FIG. 1, the vehicle 2 (and thus the vehicles 2a, 2b in FIGS. 2a-2f) may have a front end portion 16, the underside of which extends diagonally upwardly towards the front end 20 of the vehicle 2. The top of a rear end portion 18 may extend diagonally downwards towards the rear end 22 of the vehicle. This has the effect that when the second vehicle 2b pushes the first vehicle 2a, the front end portion 16 of the second vehicle 2b will overlap the downwardly sloping rear end portion 18 of the first vehicle 2a. Therefore, the feeding of the material 34 from the loading device 40 will smoothly transit from the falling into the first vehicle 2a to falling into the second vehicle 2b when the second vehicle 2b has arrived at the start position 30a of the loading area 30, which may in some embodiments coincide with the first vehicle 2a having arrived at the end position 30b of the loading area 30. However, in at least some exemplary embodiments it is conceivable to place the end position 30b further away, such that for a part of the second vehicle's 2b travel under the loading device 40 it continues to push the first vehicle 2a. Thus, the distance between the start position 30a and the end position 30b may in at least some exemplary embodiments be larger than the length of the material-receiving part of the vehicle 2, 2a, 2b, or larger than the length of the vehicle 2, 2a, 2b.

Figure 2D:
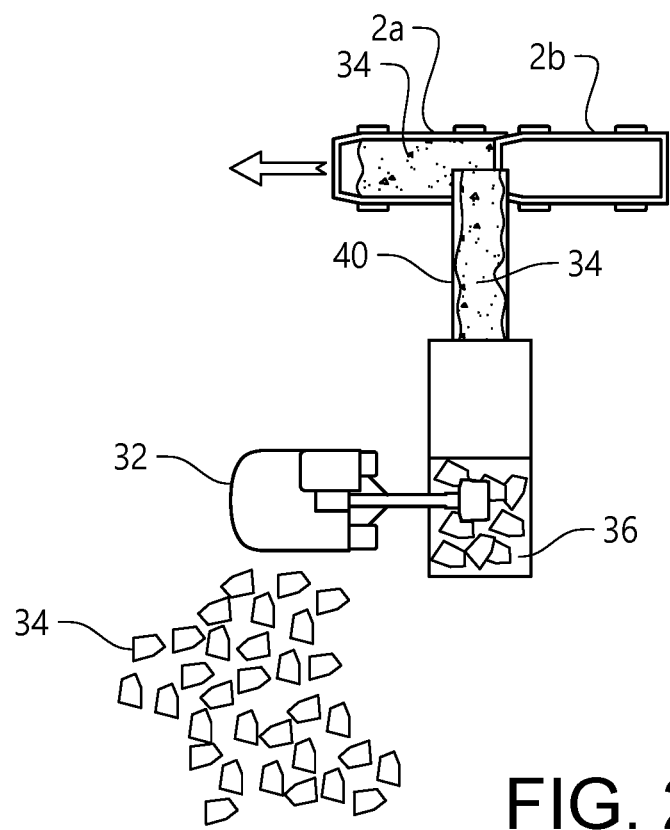

FIG. 2d illustrates the transition when the loading of the material 34 onto the first vehicle 2a has been completed, or almost completed, and the second vehicle 2b is about to receive the falling material.

Figure 2E:
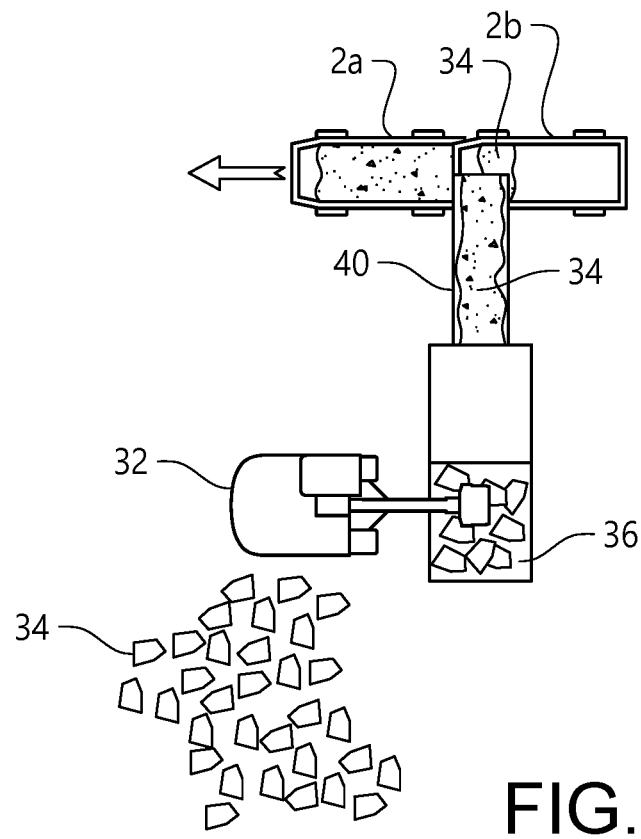

In FIG. 2e the first vehicle 2a has been pushed to the end position 30b of the loading area 30 (which may typically be defined by geographical coordinates identifiable by any suitably global navigation satellite system, GNSS). At the same time the second vehicle 2a may have arrived at the start position 30a of the loading area 30 and has already begun to receive material 34. Now that the first vehicle 2a has arrived at the end position 30b by means of the pushing second vehicle 2b, the first driving mode of the first vehicle 2a may be reactivated. It should be understood that in this disclosure, reactivating the first driving mode means that the second driving mode is cancelled. Thus, the control of the vehicle has first switched from the first driving mode to the second driving mode (deactivation step), and later the control of the vehicle is switched from the second driving mode to the first driving mode (reactivation step). The reactivation may be controlled by the local control unit of the first vehicle 2a or by commands sent form the central control unit to the local control unit. Hereby, the first vehicle 2a may be controlled to drive away individually from the loading area without any continued pushing from the second vehicle 2b. Suitably, the first vehicle 2a is driven along a predefined path to an unloading area where its transported material 34 may be unloaded, after which the first vehicle 2a may return to the loading area 30 for receiving another batch of material.

From the above, it should now be clear that, because the second vehicle 2b is in contact with the first vehicle 2a as the first vehicle 2a passes under the loading device 40, the flow of material from the loading device 40 will smoothly and substantially seamlessly continue to fall into the second vehicle 2b when the first vehicle 2a has reached the end position 30b and the second vehicle 2b has reached the start position 30a. Hereby, the risk of material spillage is reduced.

Figure 2F:
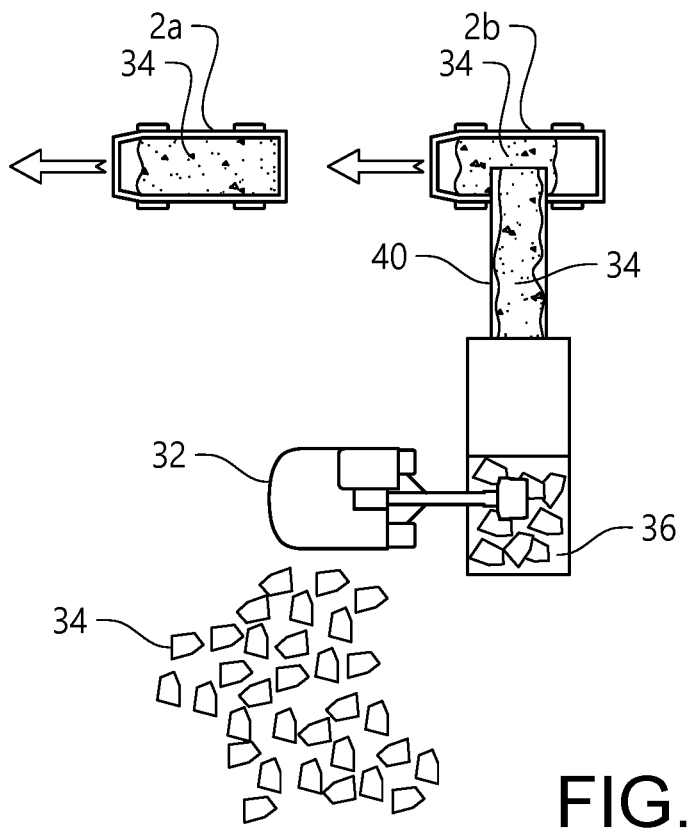

FIG. 2f illustrates that the first vehicle 2a is on its way, in its first driving mode, to a different place for unloading the received load of material. When the second vehicle 2b has been loaded it may also be driven away from the loading area 30 for unloading the received load of material 34 elsewhere. In this very simple exemplary illustration with two vehicles 2a, 2b, the loading device 40 should suitably be switched off when the second vehicle 2b has been loaded with material 34, in order to avoid spillage. However, in practical applications, it may be advantageous to have a fleet with a plurality of vehicles, such that a continuous flow of vehicles arrive at the start position of the loading area, and await a rearwardly approaching vehicle to come into contact with the waiting vehicle to be pushed along the loading area. This is illustrated in FIG. 3.

Figure 3:
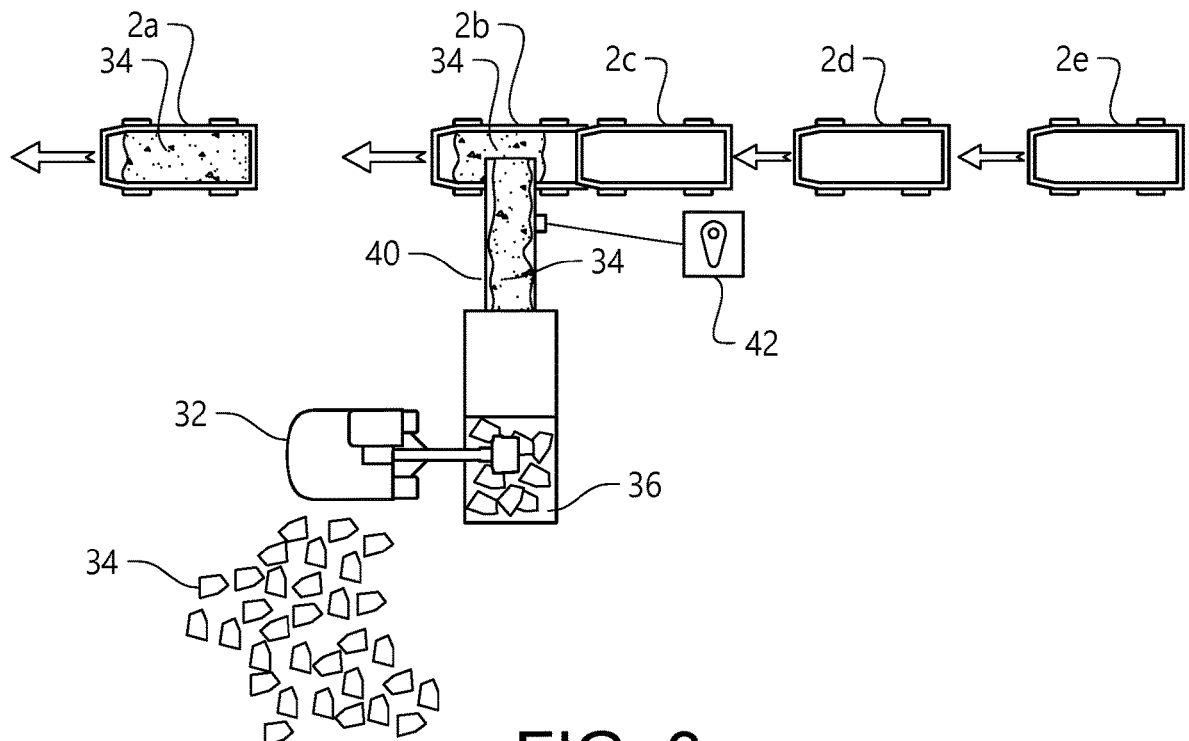
FIG. 3 illustrates another example for carrying out an exemplary embodiment of the inventive method.

Thus, FIG. 3 illustrates another example for carrying out an exemplary embodiment of the inventive method. The number of vehicles in the fleet is selected such that a continuous flow of vehicles being pushed passed the loading area may be provided. Thus, the number of vehicles in the fleet may depend on travelling distance, time of travel, time for unloading, etc. Furthermore, it may be appropriate to take into account that not all vehicles may be operational at the same time, for instance, traction batteries of some vehicles may need to be charged and temporarily be taken out form the flow.

In FIG. 3, the loading area 30, the start position 30a, and the end position 30b may suitably correspond to those illustrated in FIG. 2a, however, for the sake of clarity the reference numerals and their associated reference lines have not been indicated in FIG. 3.

By having a continuous flow of vehicles, the loading device 40 may suitably feed the material continuously to the loading area 30. In FIG. 3, the first vehicle 2a has already left the loading area 30, and the first driving mode of the second vehicle 2b was deactivated when it reached the start position 30a of the loading area 30. A third vehicle 2c has been controlled to come into contact with the second vehicle 2b and now pushes the second vehicle 2b along the loading area 30 and past the loading device 40 for enabling loading of material 34 onto the second vehicle 2b from the loading device 40 as the second vehicle 2b passes the loading device 40. When the second vehicle 2b has been pushed to the end position 30b, the first driving mode may suitable be reactivated so that the second vehicle 2b may transport the material load to an unloading area, and then return to the queue of vehicles.

The third vehicle 2c may suitably arrive at the start position 30a of the loading area 30 at the same time as the second vehicle 2b has reached the end position 30b. Furthermore, at that time, a fourth vehicle 2d may suitably have approached and come into contact with the third vehicle 2c in order to push the third vehicle 2c (having its first driving mode deactivated) along the loading area 30 for receiving the continuously falling material pieces.

The pushing vehicle, whether it is the second vehicle 2b, third vehicle 2c, fourth vehicle 2d or a further vehicle 2e, may be controlled to push with a determined pushing speed. This pushing speed is suitably based on a vehicle parameter and/or a load parameter. Examples of such parameters have been previously mentioned in this disclosure.

A first local control unit of a vehicle (such as the one exemplified in FIG. 1) may transmit a signal representative of the determined vehicle parameter and/or load parameter to a second local control unit of a following vehicle (which will push the vehicle in front of the pushing vehicle) or to the central control unit. The central control unit may then calculate and send a command to the second local control unit, in the form of a transmitted signal representative of the determined pushing speed. In some exemplary embodiments, the first local control unit may calculate the pushing speed and send a command directly to the second local control unit, without necessarily involving the central control unit.

As illustrated in FIG. 3 the loading device 40 may suitably comprise a position tracking device 42, for example similar to the local position tracking device 12 of the vehicle 2 illustrated in FIG. 1. Although not illustrated in FIGS. 2a-2f, it should be understood that the loading device 40 in FIGS. 2a-2f may also be provided with a position tracking device.

According to at least one exemplary embodiment of the invention, a signal representative of the geographical position of the loading device 40 may be sent to the central control unit. The signal may be sent directly from the position tracking device 42 or via an operatively connected transmitter. The geographical position of the loading device 40 may be used for defining geographical coordinates for the start position 30a and the end position 30b of the loading area 30.

Exemplary embodiments of an inventive system for operating a fleet of autonomous vehicles may comprise a central control unit provided separately from the vehicles, such as the central control unit 14 exemplified in FIG. 1. The central control unit may carry out steps of exemplary embodiments of the invention. The system may further comprise local control units (such as the local control unit 8 exemplified in FIG. 1), each vehicle being equipped with a respective one of said local control units. The system may further comprise the position tracking device (such as the position tracking device 42 in FIG. 3) configured to send to the central control unit a signal representative of the geographical position of the loading device 40. Similarly, the system may comprise local position tracking devices (such as the local position tracking device 12 exemplified in FIG. 1), each vehicle being provided with a respective one of said local position tracking devices, which are configured to send (directly or via an operatively connected transmitter, such as a transmitter included in the local control unit) to the central control unit a signal representative of the geographical position of the respective vehicle.

Figure 4:
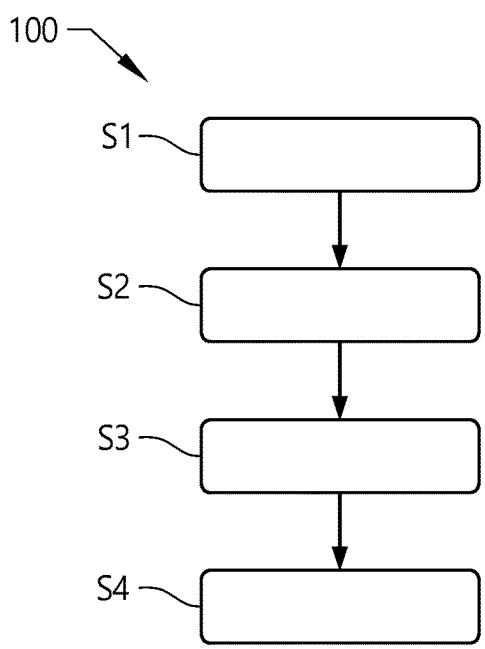
FIG. 4 is a diagram schematically illustrating a method according to an exemplary embodiment of the invention.

FIG. 4 is a diagram schematically illustrating a method 100 according to an exemplary embodiment of the invention. Thus, there is provided a method 100 of operating a fleet of autonomous vehicles at a work site having a loading area at which a loading device is provided for loading material onto said autonomous vehicles, the method comprising:

- in a step S1, controlling a first vehicle of said autonomous vehicles to drive in a first driving mode until it reaches a start position of the loading area,
- in a step S2, deactivating the first driving mode for the first vehicle by controlling the first vehicle to be positioned in the loading area in a second driving mode (for example zero torque, temporarily still, fixed negative torque and/or slowly reversing),
- in a step S3, controlling a second vehicle of said autonomous vehicles to come into contact with the first vehicle and to push the first vehicle along the loading area and past the loading device for enabling loading of material onto the first vehicle from the loading device as the first vehicle passes by the loading device,
- in a step S4, reactivating the first driving mode of the first vehicle when the second vehicle has pushed the first vehicle to an end position of the loading area.

Figure 5:
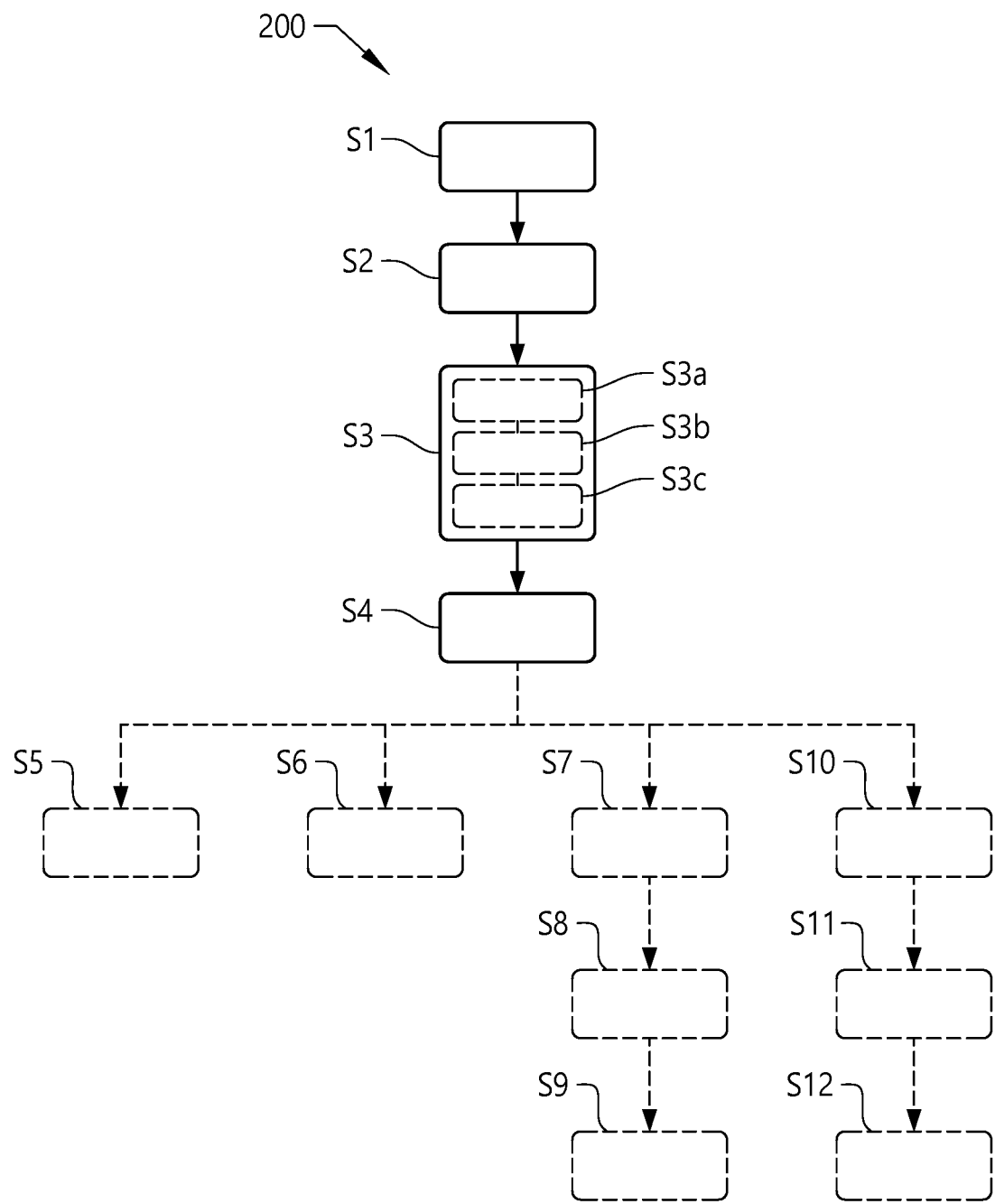
FIG. 5 is a diagram schematically illustrating a method according to some other exemplary embodiments of the invention.

FIG. 5 is a diagram schematically illustrating a method 200 according to some other exemplary embodiments of the invention. In particular FIG. 5 illustrates that a number of different additional steps may be performed.

For instance, in at least some exemplary embodiments, step S3, may comprise the following substeps:

- in a substep S3a, determining a vehicle parameter and/or a load parameter,
- in a substep S3b, determining a pushing speed based on the determined vehicle parameter and/or load parameter, and
- in a substep S3c, controlling the second vehicle to push the first vehicle with the determined pushing speed.

In exemplary embodiments, in which the first vehicle comprises a first local control unit, the method may comprise:

- in a step S5, transmitting a signal representative of the determined vehicle parameter and/or load parameter from the first local control unit to a second local control unit provided on the second vehicle or to a central control unit provided separately from the vehicles, and/or
- in a step S6, transmitting a signal representative of the determined pushing speed to a second local control unit provided on the second vehicle or to a central control unit provided separately from the vehicles.

In exemplary embodiments in which the fleet of autonomous vehicles comprises a third vehicle, the method may comprise, when the second vehicle has reached the start position of the loading area:

- in a step S7, deactivating the first driving mode for the second vehicle by controlling the second vehicle to be positioned in the loading area in the second driving mode (for example zero torque, temporarily still, and/or slowly reversing),
- in a step S8, controlling the third vehicle to come into contact with the second vehicle and to push the second vehicle along the loading area and past the loading device for enabling loading of material onto the second vehicle from the loading device as the second vehicle passes by the loading device,
- in a step S9, reactivating the first driving mode of the second vehicle when the third vehicle has pushed the second vehicle to an end position of the loading area.

In some exemplary embodiments, the start position and the end position are defined by geographical coordinates, wherein the method comprises:

- in a step S10, determining the geographical location of the autonomous vehicles by using a global navigation satellite system.

In some exemplary embodiments in which the loading device comprises a position tracking device, the method may comprise:

- in a step S11 sending, from the position tracking device to a central control unit, a signal representative of the geographical position of the loading device, and optionally
- in a step S12 defining the start position of the loading area and the end position of the loading area based on the geographical position of the loading device.

It should be noted that although FIG. 5 has been illustrated as if some of the steps being performed in groups, it should be understood that the embodiments are not limited to the illustrated grouping. For instance, in some exemplary embodiments, all the steps in FIG. 5 may be performed. Furthermore, the steps may be done in different order than those illustrated. For instance, steps S11 and S12 may suitably be performed before step S10.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a nontransitory computer-readable storage medium storing one or more programs configured to be executed by one or more processors of system for emulating remote control of the vehicles via a wireless network, the one or more programs comprising instructions for performing the method according to any one of the above-discussed embodiments.

Alternatively, according to another exemplary embodiment a cloud computing system can be configured to perform any of the method aspects presented herein. The cloud computing system may comprise distributed cloud computing resources that jointly perform the method aspects presented herein under control of one or more computer program products.

The processor(s) (associated with the fleet operating system) may be or include any number of hardware components for conducting data or signal processing or for executing computer code stored in memory. The fleet operating system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. The different features and steps of the embodiments may be combined in other combinations than those described.

It is to be understood that the present invention is not limited to the embodiments described above and illustrated in the drawings; rather, the skilled person will recognize that many changes and modifications may be made within the scope of the appended claims.

The invention claimed is:

1. A method of operating a fleet of autonomous vehicles at a work site having a loading area at which a loading device is provided for loading material onto said autonomous vehicles, the method comprising:
controlling a first vehicle of said autonomous vehicles to drive in a first driving mode until it reaches a start position of the loading area,
deactivating the first driving mode for the first vehicle by controlling the first vehicle to be positioned in the loading area in a second driving mode,
controlling a second vehicle of said autonomous vehicles to come into contact with the first vehicle and to push the first vehicle along the loading area and past the loading device for enabling loading of material onto the first vehicle from the loading device as the first vehicle passes by the loading device,
reactivating the first driving mode of the first vehicle when the second vehicle has pushed the first vehicle to an end position of the loading area.

2. The method according to claim 1, wherein in said second driving mode, a motor of the first vehicle generates a fixed negative torque or a zero torque.

3. The method according to claim 1, wherein the second vehicle arrives at the start position of the loading area simultaneously with the first vehicle arriving at the end position of the loading area, wherein the method comprises controlling the second vehicle to drive in said first driving mode until it has reached the start position of the loading area.

4. The method according to claim 1, wherein said step of controlling the second vehicle to push the first vehicle, comprises
determining a vehicle parameter and/or a load parameter,
determining a pushing speed based on the determined vehicle parameter and/or load parameter, and
controlling the second vehicle to push the first vehicle with the determined pushing speed.

5. The method according to claim 4, wherein the vehicle parameter is one or more selected from the group consisting of:
a state of charge of a traction battery of the first vehicle,
a fuel level of the first vehicle,
available loading volume of the first vehicle,
allowable loading weight of the first vehicle,
geometrical shape of the material-receiving part of the first vehicle,
tire pressure in the tires of the first vehicle,
efficiency of an electric motor of the first vehicle.

6. The method according to claim 4, wherein the first vehicle comprises a first local control unit, wherein the method comprises:
transmitting a signal representative of the determined vehicle parameter and/or load parameter from the first local control unit to a second local control unit provided on the second vehicle or to a central control unit provided separately from the vehicles, and/or
transmitting a signal representative of the determined pushing speed to a second local control unit provided on the second vehicle or to a central control unit provided separately from the vehicles.

7. The method according to claim 4, wherein the load parameter is one or more selected from the group consisting of:
size of the material to be loaded onto the first vehicle,
weight of the material to be loaded onto the first vehicle,
speed of loading the material onto the first vehicle,
type of material.

8. The method according to claim 4, wherein the determined pushing speed is further determined based on one or more of the following parameters:
a fleet distribution parameter in the form of geographical distribution of the vehicles of said fleet of autonomous vehicles at the work site,
an energy cost parameter in the form of load per consumed energy for the first vehicle to transport the load to an unloading area,
a productivity parameter in the form of delivered load per time unit for the first vehicle to deliver the load to an unloading area,
an environmental parameter in the form of present weather and/or road conditions at the work site.

9. The method according to claim 1, wherein said fleet of autonomous vehicles further comprises a third vehicle, wherein the method comprises, when the second vehicle has reached the start position of the loading area:
deactivating the first driving mode for the second vehicle by controlling the second vehicle to be positioned in the loading area in the second driving mode,
controlling the third vehicle to come into contact with the second vehicle and to push the second vehicle along the loading area and past the loading device for enabling loading of material onto the second vehicle from the loading device as the second vehicle passes by the loading device,
reactivating the first driving mode of the second vehicle when the third vehicle has pushed the second vehicle to an end position of the loading area.

10. The method according to claim 1, wherein the start position and the end position are defined by geographical coordinates, wherein the method comprises determining the geographical location of the autonomous vehicles by using a global navigation satellite system.

11. The method according to claim 10, wherein the loading device comprises a position tracking device, wherein the method comprises:
sending, from the position tracking device to a central control unit, a signal representative of the geographical position of the loading device.

12. The method according to claim 11, comprising:
defining the start position of the loading area and the end position of the loading area based on the geographical position of the loading device.

13. The method according to claim 1, wherein the loading device comprises a conveyor belt from which material is droppable onto the autonomous vehicles.

14. The method according to claim 1, comprising controlling said fleet of autonomous vehicles so that there is a continuous flow of vehicles past the loading device.

15. A non-transitory computer readable medium carrying a computer program comprising program code means for performing the steps of claim 1 when said program product is run on a computer.

16. A control unit for controlling the operation of a fleet of autonomous vehicles, the control unit being configured to perform the steps of the method according to claim 1.

17. A system for operating a fleet of autonomous vehicles, the system comprising a control unit according to claim 16.

18. The system according to claim 17, wherein the control unit is a central control unit provided separately from the vehicles.

19. The system according to claim 18, further comprising local control units, each vehicle being equipped with a respective one of said local control units.

20. The system according to claim 19, wherein said local control units are configured to send signals representative of said vehicle parameter and/or said load parameter including at least one of a state of charge of a traction battery of the first vehicle, a fuel level of the first vehicle, available loading volume of the first vehicle, allowable loading weight of the first vehicle, geometrical shape of the material-receiving part of the first vehicle tire pressure in the tires of the first vehicle, and efficiency of an electric motor of the first vehicle to the central control unit, wherein the central control unit is configured to control the operation of the vehicles based on the received signals.

21. The system according to claim 17, further comprising a position tracking device configured to send to the central control unit a signal representative of the geographical position of the loading device.

\* \* \* \* \*